Patented Feb. 14, 1939

2,147,346

UNITED STATES PATENT OFFICE 2,147,346

SULPHONIC HALIDES

Treat B. Johnson, Bethany, Conn., assignor to Rohm & Haas Company, Philadelphia, Pa., a corporation of Delaware No Drawing. Application April 10, 1937, Serial No. 136,129

12 Claims. (Cl. 260—543)

This invention relates to an improved method for the production of sulphonyl halides and sulphonic acids, which does not involve the use of dangerous materials such as phosphorus compounds, or the use of extremely unpleasant materials, such as mercaptans.

This application is a continuation-in-part of my prior application Serial No. 72,983, filed April 6, 1936.

The invention is particularly advantageous for the production of alkyl and aralkyl sulphonyl halides and sulphonic acids, but is also applicable to the production of aryl sulphonyl halides and sulphonic acids, cycloalkyl sulphonyl halides and sulphonic acids, heterocyclic sulphonyl halides and sulphonic acids, etc., as well as derivatives of such compounds, such as the corresponding sulphonamides, etc.

Methods heretofore proposed for the production of alkyl or aralkyl sulphonic acids have involved either the reaction of a sulphite, such as sodium or ammonium sulphite, with an alkyl or aralkyl halide, or have involved the oxidation of a mercaptan or a metal salt of a mercaptan by a strong oxidizing agent. Both of these methods of production have serious objections, and involve numerous difficulties.

Alkyl and aralkyl sulphonyl chlorides have heretofore been produced by the action of phosphorus pentachloride on the corresponding sulphonic acid. The use of phosphorus pentachloride in any commercial operation is, of course, highly objectionable, and the preparation of sulphonyl chlorides by this method is also expensive, as it involves the production of the sulphonic acid first. Furthermore, it is known that some alkyl and aralkyl sulphonyl chlorides undergo partial decomposition or dissociation in the presence of phosphorus pentachloride, giving sulphur dioxide and the corresponding alkyl and aralkyl chloride. Other sulphonyl halides, such as sulphonyl bromides, have never been produced in a practical manner heretofore. When a sulphonic acid is reacted with phosphorus pentabromide the corresponding bisulphide is often the major product of the reaction, rather than the desired sulphonyl bromide.

The present invention provides a method by which the various sulphonyl halides and sulphonic acids may be made commercially available, in which no dangerous or unpleasant materials are used, and in which the operating conditions involved in carrying out the process are simple to maintain.

The invention in its broader aspect comprehends the formation of a sulphonyl halide from a pseudothiourea or pseudothiourea salt by exposing an aqueous solution or suspension of the pseudothiourea or pseudothiourea salt to the action of a halogen, as shown in the following equation:

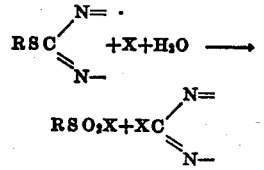

in which R represents an alkyl, aralkyl, aromatic, cycloalkyl or heterocyclic residue and X represents a halogen. This reaction is general, and is applicable to compounds having the pseudothiourea residue:

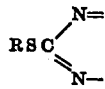

in which R represents an alkyl, an aralkyl, an aryl, cycloalkyl heterocyclic or other residue, substituted or unsubstituted, linked through a carbon atom to the sulphur, whether the three bonds shown on the nitrogen atoms are attached to hydrogens, to hydrocarbon radicals, other residues, or are part of a cyclic or ring structure. The reaction apparently involves the oxidation of the sulphur atom followed by a splitting of the bond between the sulphur and the carbon of the pseudothiourea residue, with formation of the sulphonyl halide, without any intermediate formation of a mercaptan or other undesired product.

From the sulphonyl halide derivatives so produced, the corresponding sulphonic acids are prepared by hydrolysis as by warming in water, and their metallic salts by reaction in aqueous solution, e. g., with sodium or potassium hydroxide, or other bases, either organic or inorganic, particularly the nitrogen bases.

While the invention may be used generally for the production of sulphonyl halides and sulphonic acids from compounds containing the carbon linked pseudothiourea residue described above, it is particularly advantageous for the production of sulphonyl halides and sulphonic acids from salts of alkyl and aralkyl pseudothioureas, as these are the most simply prepared from commercially available materials.

As starting materials for the preparation of the alkyl and aralkyl pseudothioureas and their salts, it is preferable in some cases to use the corresponding alkyl or aralkyl alcohol, and thiourea. The thiourea is dissolved in the alcohol, using heat, as from a water bath, if necessary, and the resulting solution is treated with an excess of an acid such as hydrochloric acid and allowed to digest until the formation of the pseudothiourea hydrochloride is complete. This requires digestion for a variable time, depending on the reactivity of the respective alcohol. After digestion, the excess alcohol is distilled off and a salt of the alkyl or aralkyl pseudothiourea corresponding to the acid used is obtained. The reaction which occurs may be illustrated by the following equation, in which, for purposes of illustration, the production of the hydrochloride of ethyl pseudothiourea is shown:

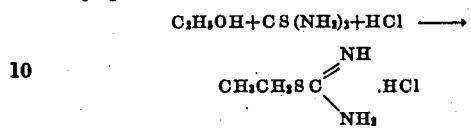

The alkyl and aralkyl pseudothiourea salts may also be produced by the action of thiourea on alkyl or aralkyl halides, sulphates, etc., such as ethyl chloride or benzylchloride in the known manner.

From the salts of alkyl and aralkyl pseudothioureas so produced, the production of the corresponding sulphonyl halides in accordance with this invention is simple. It is merely necessary to pass through an aqueous solution of the pseudothiourea salt a halogen, such as chlorine or bromine, or, more broadly, to subject an aqueous solution of the pseudothiourea salt to the action of a free halogen. The halogen reacts with the salt to oxidize the sulphur atom and to split the oxidized pseudothiourea residue, thus producing directly the desired sulphonyl halide, which is precipitated and usually is easily purified. During this operation, the reaction mixture should be maintained relatively cool, particularly when labile products, such as sulphonyl bromides, are produced, to avoid decomposition. For the production of sulphonyl chlorides, the mixture is advantageously maintained below 15° C.; for sulphonyl bromides, below 5° C.

Certain precautions must be observed, however, in the preparation of the sulphonyl halide to obtain a pure product. For example, if it is desired to produce a sulphonyl chloride, then the pseudothiourea salt which is used should either be the hydrochloride or should be the salt of some other acid which does not contain a reactive halogen other than chlorine. If salts of alkyl or aralkyl pseudothioureas with acids such as hydrobromic acid are used, the chlorine used for the production of the sulphonyl chloride reacts with the bromine in the hydrobromic acid to set free bromine, with the result that instead of the sulphonyl chloride being produced, a mixture of sulphonyl chloride and sulphonyl bromide is produced. In some circumstances such a mixture may be desired, and may be readily produced in this manner, but in normal circumstances a pure product, such as the sulphonyl chloride or the sulphonyl bromide, is desired, and care should be taken that any undesired halogen is not introduced into the product because of its presence in the pseudothiourea salts.

Similarly, for the production of a sulphonyl bromide, the use of hydrochloric acid salts of pseudothiourea should be avoided, as if hydrochloric acid salts are used, the desired sulphonyl bromide will be contaminated with traces of sulphonyl chloride. Thus for the production of sulphonyl bromide, either the hydrobromide of the desired pseudothiourea should be used, or else such salts as the acetate or the sulphate should be used.

Salts of other acids than the halogen acids of alkyl and aralkyl pseudothioureas may be readily produced. A preferred method of producing these salts is by the reaction of a hydrohalide of the desired pseudothiourea with an alkali metal salt, such as potassium or sodium acetate. In such a procedure, the alkali metal halide is produced simultaneously with the desired salt of the pseudothiourea. For example, if an aqueous solution of a hydrohalide of an alkyl pseudothiourea be treated with potassium acetate, the corresponding potassium halide and alkyl pseudothiourea acetate is produced. From this acetate, any of the desired alkyl sulphonyl halides may be produced directly by subjecting the acetate to the action of the desired halogen in water solution.

Other salts of alkyl and aralkyl pseudothioureas may be produced in other manners, for example, from the reaction of thiourea with alkyl or aralkyl nitrates, thiocyanates, sulphates, etc. For example, from diethyl sulphate, or other alkyl or aralkyl sulphates, ethyl pseudothiourea sulphate, or other alkyl or aralkyl pseudothiourea sulphates, may be produced. The sulphates so produced may be subjected to the action of a halogen in aqueous solution with production of the corresponding alkyl or aralkyl sulphonyl halides, which may be produced by proper purification in pure state without contamination by other sulphonyl halides.

The invention will be further illustrated by the following examples, although it is not limited thereto (parts by weight):

*Example 1—n-Butyl sulphonyl chloride from n-butyl alcohol.*—60 parts of n-butyl alcohol and 7.6 parts of powdered thiourea are admixed, and to the resulting solution is added an amount of hydrochloric acid slightly in excess of the amount required for equal molecular proportions with the thiourea. The solution is then heated on a steam bath for 3 or 4 days, or until a sample of the solution gives little or no silver sulphide when tested with ammoniacal silver nitrate. The excess n-butyl alcohol is then removed under reduced pressure on a steam bath and the viscous residue resulting dissolved in 75 parts of warm water. This solution is cooled and treated with chlorine while maintained below 15° C. Sufficient chlorine is added to saturate the aqueous layer, the saturation being shown by the characteristic green color of the saturated aqueous layer, and the n-butyl sulphonyl chloride which separates is taken up in ether. The ether extract is washed with dilute sodium bisulfite solution and dried over calcium chloride. The ether is removed. To further purify the sulphonyl chloride, it may be distilled under reduced pressure. The product has a boiling point of 79 to 81° C. (9 mm.). The reactions which take place in this procedure are shown in the following equation:

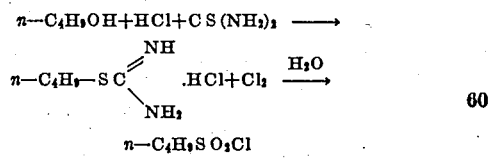

From the n-butyl sulphonyl chloride produced as described above, the corresponding sulphonic acid, n-butyl sulphonic acid, may be produced by hydrolyzing the sulphonyl chloride in boiling water with the production of hydrochloric acid and n-butyl sulphonic acid. The hydrochloric acid and excess water may be readily removed by evaporation, and the sulphonic acid obtained. The sodium and potassium salts of the sulphonic acid may be obtained by interaction of the n-butyl sulphonyl chloride with sodium and potassium hydroxide in aqueous solution.

*Example 2—Ethyl sulphonyl chloride from*

*ethyl sulphate.*—33 parts of diethyl sulphate and 30 parts of thiourea are warmed on a steam bath until solution is complete and a vigorous reaction takes place. The reaction, if it becomes too vigorous, may be modified by cooling the mixture. After the reaction is finished, alcohol is added and the mixture is further heated for about ½ hour to insure completion of the reaction. The solid ethyl pseudothiourea sulphate which is formed is filtered off and dried.

15.4 parts of the ethyl pseudothiourea sulphate are dissolved in 75 parts of water and the solution is cooled in an ice bath, and treated with chlorine while maintained below 15° C. The addition of chlorine is continued until the aqueous layer is distinctly green with excess chlorine. The ethyl sulphonyl chloride separates as an oil, and, after its separation is complete, is mechanically separated or the mixture is extracted with ether and the ether extract washed with dilute sodium bisulphite solution and dried over calcium chloride. The ether is removed and the ethyl sulphonyl chloride distilled under reduced pressure to purify it. It boils at 71–72° C. (12 mm.).

The reactions which take place when this procedure is followed are shown in the following equation:

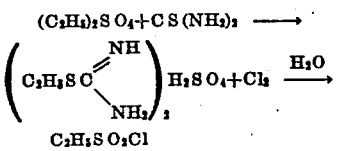

From the ethyl sulphonyl chloride so produced, the corresponding ethyl sulphonic acid is produced by hydrolyzing in boiling water. The sodium and potassium salts of the ethyl sulphonic acid may be formed by interaction of the ethyl sulphonyl chloride with sodium and potassium hydroxide in aqueous solution.

*Example 3.—n-Heptyl sulphonyl chloride from n-heptyl bromide.*—18.5 parts of n-heptyl bromide, 7.6 parts of thiourea, and 16 parts of ethyl alcohol are heated on a steam bath under reflux conditions until all of the thiourea is in solution and a sample of the solution gives no precipitate of silver sulphide with ammoniacal silver nitrate. The ethyl alcohol is distilled off under reduced pressure and the n-heptyl pseudothiourea hydrobromide formed is allowed to crystallize.

20 parts of this hydrobromide are dissolved in 75 parts of hot water, and the resulting solution is treated with a hot solution of 35 parts of potassium acetate in 40 parts of water. The resulting mixture is cooled, and the precipitated n-heptyl pseudothiourea acetate is filtered off and purified by recrystallization from water. 12 parts of the n-heptyl pseudothiourea acetate are dissolved in 135 parts of water and 2 parts of concentrated hydrochloric acid are added. The resulting solution is cooled and treated with chlorine at a temperature below 15° C. After the n-heptyl sulphonyl chloride is completely separated, the mixture is extracted with ether, the ether extract is washed with dilute sodium bisulphite, and dried over calcium chloride. The ether is removed and the residue, consisting of n-heptyl sulphonyl chloride, is distilled under reduced pressure to purify it. The product has a boiling point of 126 to 129° C. (11 mm.).

The reactions which take place when this procedure is followed are shown in the following equation:

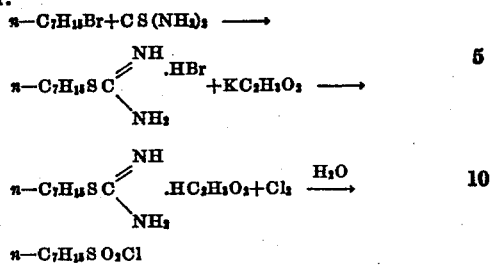

The corresponding n-heptyl sulphonic acid may be obtained from the sulphonyl chloride by hydrolyzing with water.

*Example 4—Ethyl sulphonyl bromide from ethyl bromide.*—Ethyl bromide and thiourea in equal molecular proportions are heated together in ethyl alcohol. When the thiourea is all dissolved, and a sample of the solution gives no silver sulphide with ammoniacal silver nitrate, the alcohol is removed under reduced pressure and the residue is allowed to crystallize. It is ethyl pseudothiourea hydrobromide.

18.5 parts of this ethyl pseudothiourea hydrobromide are dissolved in 200 cc. of water. The solution is cooled, and treated with 125 parts of bromine. The bromine is added over a period of about ¾ of an hour with vigorous stirring and while maintaining the temperature below 5° C. After the addition of bromine is complete, the reaction mixture is stirred at 5° C. or lower for about 3 hours. The precipitated ethyl sulphonyl bromide is taken up in ether and the excess bromine removed from this extract by washing with dilute sodium bisulphite, preferably in a series of washing operations with small portions of the bisulphite solution. The extract is then washed with water, dried and the ether distilled off. The resulting purified ethyl sulphonyl bromide is then distilled under reduced pressure to purify it. It boils at 84–86° C. (18 mm.).

The reactions which occur when this procedure is followed are shown in the following equation:

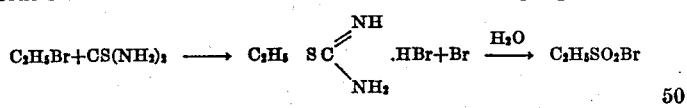

*Example 5—Benzylsulphonyl chloride from benzylchloride.*—12.6 parts of benzylchloride and 7.6 parts of powdered thiourea are warmed together on a steam bath until a vigorous reaction takes place. When the reaction subsides, the mixture is heated for a few minutes and then is dissolved in 150 parts of water. The resulting solution is cooled below 15° C. and is treated with chlorine with continued cooling, and while maintaining the temperature below 15° C. The addition of chlorine is continued until the reaction mixture has a distinct green color from the excess chlorine. The solid benzylsulphonyl chloride which separates is filtered off and the filtrate is tested for the completeness of the reaction by further addition of chlorine. The separated benzylsulphonyl chloride is dried over sulfuric acid and recrystallized from benzene. It has a melting point of 91–92° C.

The reactions which take place when this procedure is followed are similar to those shown for the production of ethyl sulphonyl bromide from ethyl bromide in Example 4 above.

Benzylsulphonic acid is produced from benzylsulphonyl chloride by hydrolysis with water, but the sulphonyl chloride undergoes partial decomposition during this hydrolysis with evolution of sulphur dioxide.

*Example 6—Ethylsulphonyl chloride from 2-ethylmercapto-4-chloro-5-carbethoxypyrimidine.*—6.3 parts of 2-ethylmercapto-4-chloro-5-carbethoxypyrimidine are suspended in 60 parts of water at about 30–40° C. and chlorine is rapidly passed into the mixture. When the oil formed is completely separated, the mixture is shaken with petroleum ether, and the resulting extract fractionated at reduced pressure. The fraction boiling at 68–74° C./18 mm. is taken as ethyl sulphonyl chloride, as it formed sulphonamid (ethyl sulphonamid), M. P. 59–60° C. and ammonium ethylsulphonate, M. P. 208–209° C.

The reaction involved in this process may be represented by the graphic equation:

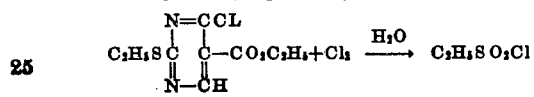

In the following examples, processes which have been described in detail in the previous examples will merely be outlined, these examples serving to illustrate the broad scope of the invention, it being understood that the processes in general are similar to those previously described.

*Example 7—Dodecyl sulphonyl chloride from dodecyl chloride.*—Dodecyl pseudothiourea hydrochloride is produced from dodecyl chloride and thiourea following the procedure outlined in previous examples, and is dissolved in water and treated with chlorine while maintained below about 15° C. The dodecyl sulphonyl chloride obtained melts at 42–43° C. while the corresponding sulphonamid, readily obtained, melts at 93–94° C.

The corresponding hexadecyl sulphonyl chloride, melting point 53–54° C., and sulphonamid, melting point 96.5–97.5° C. are readily obtained in a similar manner from hexadecyl chloride.

*Example 8—Sec. butyl sulphonyl chloride from sec. butyl alcohol.*—Sec. butyl alcohol and thiourea are reacted in the presence of hydrochloric acid, following the procedure previously outlined, and the resulting product is treated in aqueous solution with chlorine, with the production of sec. butyl sulphonyl chloride, boiling point 89–90.5° C./19 mm.

*Example 9—Cyclohexylsulphonyl chloride from cyclohexyl alcohol.*—Cyclohexy alcohol and thiourea are reacted as described in the presence of hydrochloric acid, and the resulting product is treated in aqueous solution with chlorine, with the formation of cyclohexyl-sulphonyl chloride, boiling point 123–124° C./6 mm. The corresponding sulphonamide melts at 94–95° C.

*Example 10—p-Nitrobenzylsulphonyl chloride from p-nitrobenzyl chloride.*—p-Nitrobenzyl chloride is reacted with thiourea as described, and the resulting p-nitrobenzyl pseudothiourea hydrochloride is treated in aqueous solution with chlorine, with the formation of p-nitrobenzylsulphonyl chloride, melting point 93–94° C. The corresponding sulphonamide has a melting point of 205° C.

*Example 11 — Tetrahydrofurfuryl sulphonyl chloride from tetrahydrofurfuryl chloride.*—Tetrahydrofurfuryl chloride is reacted with thiourea as described, and the resulting tetrahydrofurfuryl pseudothiourea hydrochloride is treated in aqueous solution with chlorine, with the production of tetrahydrofurfuryl sulphonyl chloride, boiling point 115–116° C./5 mm. There is considerable decomposition during the chlorination.

*Example 12—B-acetoxyethyl sulphonyl chloride from B-acetoxyethyl chloride.*—B-acetoxyethyl chloride and thiourea are reacted as described, and the resulting product is treated in aqueous solution with chlorine, with the formation of B-acetoxyethyl sulphonyl chloride, boiling point 101–103° C./4 mm., according to the equation:

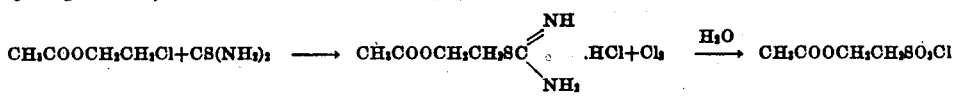

*Example 13.—B-B'-disulphonyl chloride ethyl ether from B-B'-dichlorethyl ether.*—B-B'-dichloroethyl ether and thiourea are reacted as described and the resulting product treated in aqueous solution with chlorine, with the production of crude B-B'-disulphonyl chloride ethyl ether, according to the equation:

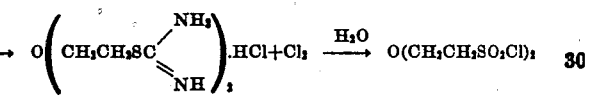

Successful purification of this product by distillation has not yet been accomplished.

In addition to the sulphonyl halides and sulphonic acids described in the examples, numerous other sulphonyl halides and sulphonic acids may be prepared in accordance with the present invention. Among the alkyl sulphonyl halides which may be readily produced are the lower alkyl compounds such as the methyl, ethyl, the isomeric propyls, butyls, amyls, hexyls, heptyls, etc., as well as the higher alkyl sulphonyl halides such as the cetyl, oleyl, stearyl, etc. Also, the various aralkyl sulphonyl halides and the sulphonic acids may be readily prepared. Included among the arakyl sulphonyl halides which may be readily prepared are the benzyl, phenyl ethyl, nitrobenzyl, other substituted benzyls, etc. For the production of such sulphonyl halides and sulphonic acids, the starting materials may be either the corresponding alcohols or corresponding esters, such as sulphates, chlorides, nitrates, acetates, etc., although in general it will be found more advantageous to use the alcohols for the production of the lower alkyl and cycloalkyl derivatives and to use the salts for the production of the higher alkyl, heterocyclic and aralkyl derivatives.

The aralkyl derivatives, in addition to having the sulphonyl halide group or the sulphonic acid group attached to the alkyl chain, may also be substituted in the aromatic or cyclic nucleus. Substituents such as sulphonic acid groups, or halogen groups, or other groups, in the aromatic or cyclic nucleus in no way interfere with the process of the present invention for the production of sulphonyl halides and sulphonic acids, either in the production of the intermediate pseudothiourea derivatives, or the production of the sulphonyl halides and sulphonic acids from these intermediates.

The invention, as previously pointed out, is also applicable to the production of heterocyclic, cycloalkyl and aryl sulphonyl halides and sulphonic acids. In the aryl derivatives, the sulphonyl halide group or sulphonic acid group is directly attached to the aromatic or cyclic nucleus. The intermediate aryl pseudothiourea compounds, however, cannot be prepared in the manner described above for the production of alkyl and aralkyl pseudothiourea compounds, but must be prepared in some other manner, as by the addition of a thiophenol to a cyanamid.

In the process as hereinbefore described, the hydrolysis of the sulphonyl halides to produce the corresponding sulphonic acids has followed the isolation of the sulphonyl halides; but such isolation is not always necessary, as many of the sulphonic acids may be produced by hydrolysis of the sulphonic halides without their intermediate separation or isolation from the reaction mixture in which they are produced.

While the invention has been described with particular reference to the production of sulphonyl chlorides and sulphonyl bromides, it also includes the production of homologous sulphonyl fluorides and sulphonyl iodides, and while it is particularly advantageous for use in the conversion of alkyl or aralkyl pseudothiourea salts to corresponding sulphonyl halides by the action of a halogen, it is also applicable to the production of sulphonyl halides from other compounds in which a pseudothiourea residue is connected to an alkyl group through the sulphur atom. Included in this class of compounds are compounds such as alkyl or aryl derivatives of alkyl pseudothioureas, in which the hydrogen atoms linked with the nitrogen are replaced by aliphatic or aromatic radicals, as well as heterocyclic compounds, in which the pseudothiourea nucleus is part of a ring structure.

I claim:

1. The process of producing sulphonyl halides which comprises subjecting an aqueous solution of a compound of the formula

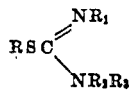

in which R is a residue selected from the class consisting of alkyl, aralkyl, and aryl residues, and in which $R_1$, $R_2$, and $R_3$ are residues indifferently selected from the class consisting of hydrogen and alkyl, aralkyl and aryl residues, to the action of a halogen.

2. The process of producing compounds of the class consisting of alkyl, aralkyl and aryl sulphonyl halides which comprises subjecting an aqueous solution of a compound having the organic nucleus of the desired compound attached to a pseudothiourea residue through a carbon atom to the sulphur atom of the pseudothiourea residue, to the action of a halogen.

3. The process of producing compounds of the formula $RSO_2X$ in which R is an organic radical linked to the $SO_2X$ radical through a carbon atom and X is a halogen which comprises subjecting a compound having the organic radical of the desired compound attached to the sulphur atom of a pseudothiourea residue through a carbon atom to the action of a halogen in the presence of water.

4. The process of producing sulphonyl halides which comprises subjecting a compound having an organic radical attached through a carbon atom to the sulphur of a pseudothiourea residue to the action of a halogen in the presence of water.

5. The process of producing sulphonyl halides which comprises subjecting a compound having the radical

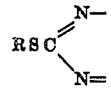

in which R is an organic radical attached to the sulphur atom through a carbon atom to the action of a halogen in the presence of water.

6. The process of producing sulphonyl halides which comprises subjecting an aqueous solution of a salt of a pseudothiourea derivative having an organic radical attached through a carbon atom to the sulphur atom of the pseudothiourea residue to the action of a halogen.

7. The process of producing compounds of the formula $RSO_2X$ in which R is an organic radical and X is a halogen which comprises subjecting an aqueous solution of a salt of a compound of the formula

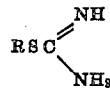

to the action of a halogen.

8. The process of producing sulphonyl halides which comprises subjecting a compound of the formula

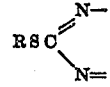

in which R is an organic radical and the

linkage is part of a heterocyclic ring structure to the action of a halogen in the presence of water.

9. The process of producing sulphonyl bromides which comprises subjecting an aqueous solution of a salt of a compound of the formula

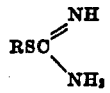

in which R is an organic radical attached to the sulphur atom through a carbon atom with an acid selected from the group consisting of hydrobromic and non-halogen containing acids to the action of bromine.

10. The process of producing sulphonyl bromides which comprises subjecting an aqueous solution of a salt of a compound of the class consisting of S-alkyl, S-aryl and S-aralkyl pseudothioureas with an acid selected from the group consisting of hydrobromic and non-halogen containing acids to the action of bromine.

11. The process of producing alkyl sulphonyl bromides which comprises subjecting an aqueous solution of a salt of an S-alkyl pseudothiourea with an acid selected from the group consisting of hydrobromic and non-halogen containing acids to the action of bromine.

12. The process of producing aralkyl sulphonyl bromides which comprises subjecting an aqueous solution of a salt of an S-aralkyl pseudothiourea with an acid selected from the group consisting of hydrobromic and non-halogen containing acids to the action of bromine.

TREAT B. JOHNSON.